US011543425B2

(12) United States Patent
Kimura et al.

(10) Patent No.: US 11,543,425 B2
(45) Date of Patent: Jan. 3, 2023

(54) ROAD SURFACE DAMAGE DETECTION DEVICE, ROAD SURFACE DAMAGE DETECTION METHOD, AND PROGRAM

(71) Applicant: TOYOTA JIDOSHA KABUSHIKI KAISHA, Toyota (JP)

(72) Inventors: Yosuke Kimura, Nissin (JP); Takeo Moriai, Nagakute (JP); Masaya Fujimori, Susono (JP); Tatsuya Obuchi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 16/927,289

(22) Filed: Jul. 13, 2020

(65) Prior Publication Data

US 2021/0165012 A1 Jun. 3, 2021

(30) Foreign Application Priority Data

Nov. 29, 2019 (JP) .............................. JP2019-216123

(51) Int. Cl.
*G01P 3/44* (2006.01)
(52) U.S. Cl.
CPC ...................... *G01P 3/44* (2013.01)
(58) Field of Classification Search
CPC ........................................................ G01P 3/44
USPC ........................................................ 73/146
See application file for complete search history.

(56) References Cited

U.S. PATENT DOCUMENTS

| 2016/0356002 | A1  | 12/2016 | Tani   |             |
|--------------|-----|---------|--------|-------------|
| 2017/0243370 | A1* | 8/2017  | Hoye   | B60R 1/10   |
| 2018/0121275 | A1* | 5/2018  | Park   | G06F 11/0751|
| 2019/0079539 | A1* | 3/2019  | Sridhar| G05D 1/0278 |

FOREIGN PATENT DOCUMENTS

| JP | 2005-249525 A  | 9/2005 |
| JP | 2016-057861 A  | 4/2016 |
| WO | 2015141559 A1  | 9/2015 |

\* cited by examiner

*Primary Examiner* — Walter L Lindsay, Jr.
*Assistant Examiner* — Philipmarcus T Fadul
(74) *Attorney, Agent, or Firm* — Oliff PLC

(57) ABSTRACT

A road surface damage detection device is configured to calculate, for each of road sections, a maximum variation rate that is a maximum value of a variation amount of a wheel speed per unit time in each of vehicles. The device is configured to periodically select, for each of the road sections, a maximum value from the maximum variation rate of each of the vehicles in a prescribed period, set the selected maximum value as a section maximum variation rate, and determine whether or not the road surface damage has occurred by comparing a determination target value with a positive threshold, the determination target value being obtained by subtracting a comparison value, based on at least one of the section maximum variation rates set before last time, from the section maximum variation rate that is set latest.

12 Claims, 11 Drawing Sheets

ROAD SURFACE DAMAGE DETECTION DEVICE, ROAD SURFACE DAMAGE DETECTION METHOD, AND PROGRAM

CROSS-REFERENCE TO RELATED APPLICATION

This application claims priority to Japanese Patent Application No. 2019-216123 filed on Nov. 29, 2019, incorporated herein by reference in its entirety.

BACKGROUND

1. Technical Field

The present disclosure relates to a road surface damage detection device, a road surface damage detection method, and a program.

2. Description of Related Art

As a road surface damage detection device of this type, there has been proposed a device configured to select information used for analysis, out of a plurality of pieces of information for analysis (such as road surface images, rutting, and acceleration) from vehicles for each of the road sections, analyze the selected information for analysis, calculate a representative value (for example, a maximum value) of analysis result information, and generate a warning signal when the calculated representative value exceeds a threshold (see, for example, Japanese Patent Application Publication No. 2005-249525).

SUMMARY

Since the aforementioned road surface damage detection device uses the representative value of the analysis result based on a plurality of pieces of information for analysis from vehicles, time-series changes of the pieces of information for analysis from the vehicles are not reflected upon the representative value. Accordingly, when an unexpected road surface damage, such as a pothole, occurs in road sections, there is a possibility that the road surface damage is not appropriately detected.

A primary object of a road surface damage detection device, a road surface damage detection method, and a program of the present disclosure is to appropriately detect a road surface damage when the road surface damage occurs unexpectedly in the road sections.

To accomplish the primary object, the road surface damage detection device, the road surface damage detection method, and the program of the present disclosure take following measures.

A road surface damage detection device of the present disclosure is a road surface damage detection device for detecting a road surface damage for each of road sections based on vehicle information from each of vehicles that have traveled. The device includes a first processor and a second processor. The first processor is configured to calculate, for each of the road sections, a maximum variation rate that is a maximum value of a variation amount of a wheel speed per unit time in each of the vehicles. The second processor is configured to periodically select, for each of the road sections, a maximum value from the maximum variation rate of each of the vehicles in a prescribed period, set the selected maximum value as a section maximum variation rate, and determine whether or not the road surface damage has occurred by comparing a determination target value with a positive threshold, the determination target value being obtained by subtracting a comparison value, based on at least one of the section maximum variation rates set before last time, from the section maximum variation that is set latest.

The road surface damage detection device of the present disclosure is configured to calculate, for each of the road sections, a maximum variation rate that is a maximum value of a variation amount of a wheel speed per unit time in each of the vehicles. The device is configured to periodically select, for each of the road sections, a maximum value from the maximum variation rate of each of the vehicles in a prescribed period, set the selected maximum value as a section maximum variation rate, and determine whether or not the road surface damage has occurred by comparing a determination target value with a positive threshold, the determination target value being obtained by subtracting a comparison value, based on at least one of the section maximum variation rates set before last time, from the section maximum variation rate that is set latest. Accordingly, a time-series change in the section maximum variation rate is reflected upon the determination target value, and therefore when an unexpected road surface damage, such as a pothole, occurs in each of the road sections, the road surface damage can appropriately be detected. Here, the road includes public roads (driveways and sidewalks) as well as private roads and parking lots (for example, passages).

In the road surface damage detection device of the present disclosure, the second processor may set the section maximum variation rate that is set latest as the comparison value. The second processor may also set an average or an intermediate value of the section maximum variation rates that is set before last time as the comparison value. The second processor may further set as the comparison value a predicted value of the latest section maximum variation rate based on the section maximum variation rates set before last time.

In these cases, the second processor may set as the threshold a value that is smaller by a margin than the past determination target value when it is determined that the road surface damage has occurred. In this case, the second processor may set the margin based on one of or both the number of vehicles used for setting the latest section maximum variation rate and the number of vehicles used for setting the comparison value.

In these cases, the second processor may calculate an interquartile range using the past maximum variation rate of each of the vehicles when it is determined that the road surface damage has not occurred, and set as the threshold a value that is larger by a margin than a prescribed multiple of the calculated interquartile range. In this case, the second processor may set the margin based on one of or both the number of vehicles used for setting the latest section maximum variation rate and the number of vehicles used for setting the comparison value.

In the road surface damage detection device of the present disclosure, after determining that the road surface damage has occurred, the second processor may compare the determination target value with a negative second threshold to determine whether or not the road surface damage is eliminated. With the configuration, the elimination of the road surface damage can appropriately be detected.

A road surface damage detection method of the present disclosure is a road surface damage detection method for detecting a road surface damage for each of road sections based on vehicle information from each of vehicles that have traveled. The method includes: (a) a step of calculating, for each of the road sections, a maximum variation rate that is a maximum value of a variation amount of a wheel speed per unit time in each of the vehicles; and (b) a step of periodically selecting, for each of the road sections, a maximum value from the maximum variation rate of each of the vehicles in a prescribed period, setting the selected maximum value as a section maximum variation rate, and determining whether or not the road surface damage has occurred by comparing a determination target value with a threshold, the determination target value being obtained by subtracting a comparison value, based on at least one of the section maximum variation rates set before last time, from the section maximum variation rate that is set latest.

In the road surface damage detection method of the present disclosure, for each of the road sections, a maximum variation rate that is a maximum value of a variation amount of a wheel speed per unit time in each of the vehicles is calculated. Then, for each of the road sections, a maximum value is periodically selected from the maximum variation rate of each of the vehicles in a prescribed period, the selected maximum value is set as a section maximum variation rate, and whether or not the road surface damage has occurred is determined by comparing a determination target value with a positive threshold, the determination target value being obtained by subtracting a comparison value, based on at least one of the section maximum variation rates set before last time, from the section maximum variation rate that is set latest. Accordingly, a time-series change in the section maximum variation rate is reflected upon the determination target value, and therefore when an unexpected road surface damage, such as a pothole, occurs in each of the road sections, the road surface damage can appropriately be detected. Here, the road includes public roads (driveways and sidewalks) as well as private roads and parking lots (for example, passages).

A program of the present disclosure is a program for causing a computer to function as a road surface damage detection device for detecting a road surface damage for each of road sections based on vehicle information from each of vehicles that have traveled. The program includes: (a) a step of calculating, for each of the road sections, a maximum variation rate that is a maximum value of a variation amount of a wheel speed per unit time in each of the vehicles; and (b) a step of periodically selecting, for each of the road sections, a maximum value from the maximum variation rate of each of the vehicles in a prescribed period, setting the selected maximum value as a section maximum variation rate, and determining whether or not the road surface damage has occurred by comparing a determination target value with a threshold, the determination target value being obtained by subtracting a comparison value, based on at least one of the section maximum variation rates set before last time, from the section maximum variation rate that is set latest.

In the program of the present disclosure, for each of the road sections, a maximum variation rate that is a maximum value of a variation amount of a wheel speed per unit time in each of the vehicles is calculated. Then, for each of the road sections, a maximum value is periodically selected from the maximum variation rate of each of the vehicles in a prescribed period, the selected maximum value is set as a section maximum variation rate, and whether or not the road surface damage has occurred is determined by comparing a determination target value with a positive threshold, the determination target value being obtained by subtracting a comparison value, based on at least one of the section maximum variation rates set before last time, from the section maximum variation rate that is set latest. Accordingly, a time-series change in the section maximum variation rate is reflected upon the determination target value, and therefore when an unexpected road surface damage, such as a pothole, occurs in each of the road sections, the road surface damage can appropriately be detected. Here, the road includes public roads (driveways and sidewalks) as well as private roads and parking lots (for example, passages).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, aspects for carrying out the present disclosure will be described based on embodiments.

Figure 1:
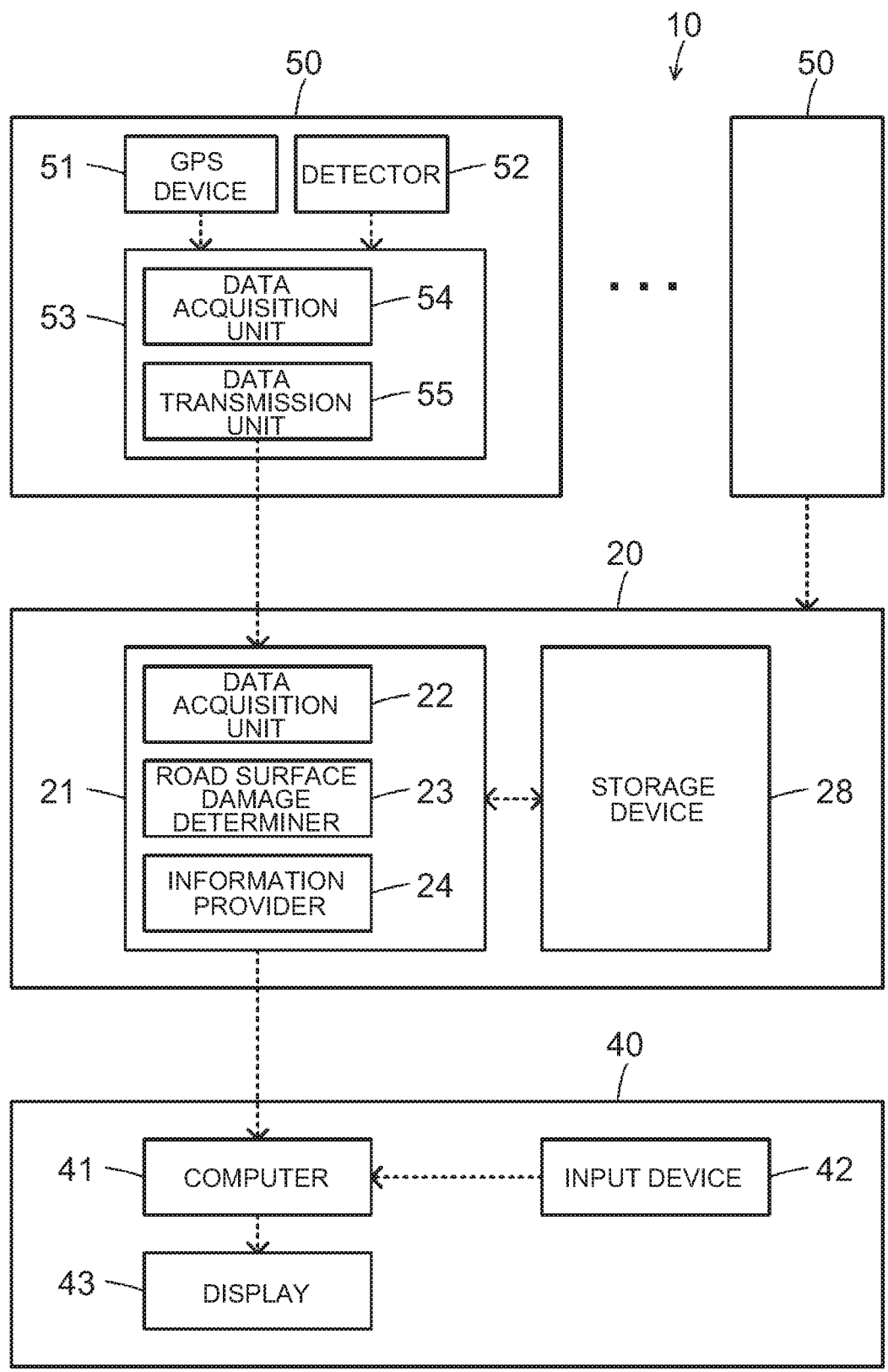
FIG. 1 is a block diagram showing an outlined configuration of a road management system 10 including a road surface damage detection device as one embodiment of the present disclosure.

FIG. 1 is a block diagram showing an outlined configuration of a road management system 10 including a road surface damage detection device as one embodiment of the present disclosure. As shown in the drawing, the road management system 10 of the embodiment includes a server 20 as a road surface damage detection device that can wirelessly communicate with each of vehicles 50, and a terminal device 40 that can communicate with the server 20 in a wired or wireless manner. In the following description, the road includes public roads (driveways and sidewalks) as well as private roads and parking lots (for example, passages). The "road surface damage detection device" of the embodiment corresponds to the server 20.

Each of the vehicles 50 includes a GPS device 51 that acquires location information relating to the current location of the vehicle, a detector 52 that detects behavior information relating to the behavior of the vehicle 50, and an electronic control unit (hereinafter referred to as "ECU") 53. The detector 52 includes a sensor for detecting the information indicating the behavior of the vehicle 50, a sensor for detecting the information that influences the behavior of the vehicle 50, and a sensor for detecting the information in the periphery of the vehicle 50.

Here, examples of the information indicating the behavior of the vehicle 50 may include at least one of vehicle speed, wheel speed, longitudinal acceleration, lateral acceleration, a yaw rate, a yaw angle, a roll angle, a pitch angle, and a tire slip ratio.

Examples of the information that influences the behavior of the vehicle 50 may include an operating state of an operating device that a driver can operate, and an operational state of a support system for supporting the travel of the vehicle 50. Here, examples of the operating state of the operating device may include at least one of a steering angle or a steering speed of a steering wheel, a depression amount of an accelerator pedal, a depression amount of a brake pedal, a shift position of a shift lever, and the presence or absences of operation of blinkers. Examples of the support system may include at least one of a lane departure alert (LDA) system, an anti-lock brake system (ABS), a traction control (TRC) system, and an electronic stability control (ESC) system.

Examples of the sensor for detecting the information in the periphery of the vehicle 50 may include at least one of a camera, a radar, and a light detection and ranging (Lidar).

The ECU 53 includes a CPU, a ROM, a RAM, a flash memory, an input-output port, and a communication port. The ECU 53 includes a data acquisition unit 54 and a data transmission unit 55 as a functional block formed in collaboration with hardware and software. The data acquisition unit 54 acquires the location information regarding the vehicle 50 from the GPS device 51, and the behavior information regarding the vehicle 50 from the detector 52. The data transmission unit 55 wirelessly transmits the location information and the behavior information regarding the vehicle 50 acquired by the data acquisition unit 54 to the server 20 as the vehicle information.

The server 20 is configured as a computer that includes an arithmetic processing unit 21 and a storage device 28. The arithmetic processing unit 21 includes a CPU, a ROM, a RAM, a flash memory, an input-output port, and a communication port. The arithmetic processing unit 21 includes a data acquisition unit 22, a road surface damage determiner 23, and an information provider 24 as a functional block formed in collaboration with hardware and software. The data acquisition unit 22, the road surface damage determiner 23, and the information provider 24 exchange data with the storage device 28, respectively.

The data acquisition unit 22 wirelessly acquires vehicle information from the vehicles 50, and stores the information in the storage device 28. Based on the vehicle information from the vehicles 50, the road surface damage determiner 23 periodically determines whether a road surface damage has occurred for each of the road sections within a management target range, and stores determination results and the like in the storage device 28. Here, the "management target range" is defined as a range (for example, a prefecture range, a municipal range, etc.) desired by users (for example, persons in charge of government offices, etc.). The "road section" is defined as a section of about several meters to some ten m), for example. Examples of the "road surface damage" may include potholes (small holes in comparison with street widths or vehicle widths). The road surface damage determiner 23 will be described later in detail.

The information provider 24 transmits various pieces of information to a computer 41 of the terminal device 40. The storage device 28 is configured as a hard disk, a solid state drive (SSD), or the like. The storage device 28 stores various pieces of information necessary for operation of the arithmetic processing unit 21. Examples of the information stored in the storage device 28 may include map information, vehicle information regarding the vehicles 50 acquired by the data acquisition unit 22, and information stored by the road surface damage determiner 23.

The terminal device 40 is configured as a desktop personal computer, a notebook computer, a tablet terminal, or the like. The terminal device 40 includes the computer 41, an input device 42 connected to the computer 41, and a display 43 as a display device. The computer 41 includes a CPU, a ROM, a RAM, a flash memory, a storage device (a hard disk, or a SSD), an input-output port, and a communication port. Examples of the input device 42 may include a mouse, a keyboard, and a touch panel.

Figure 2:
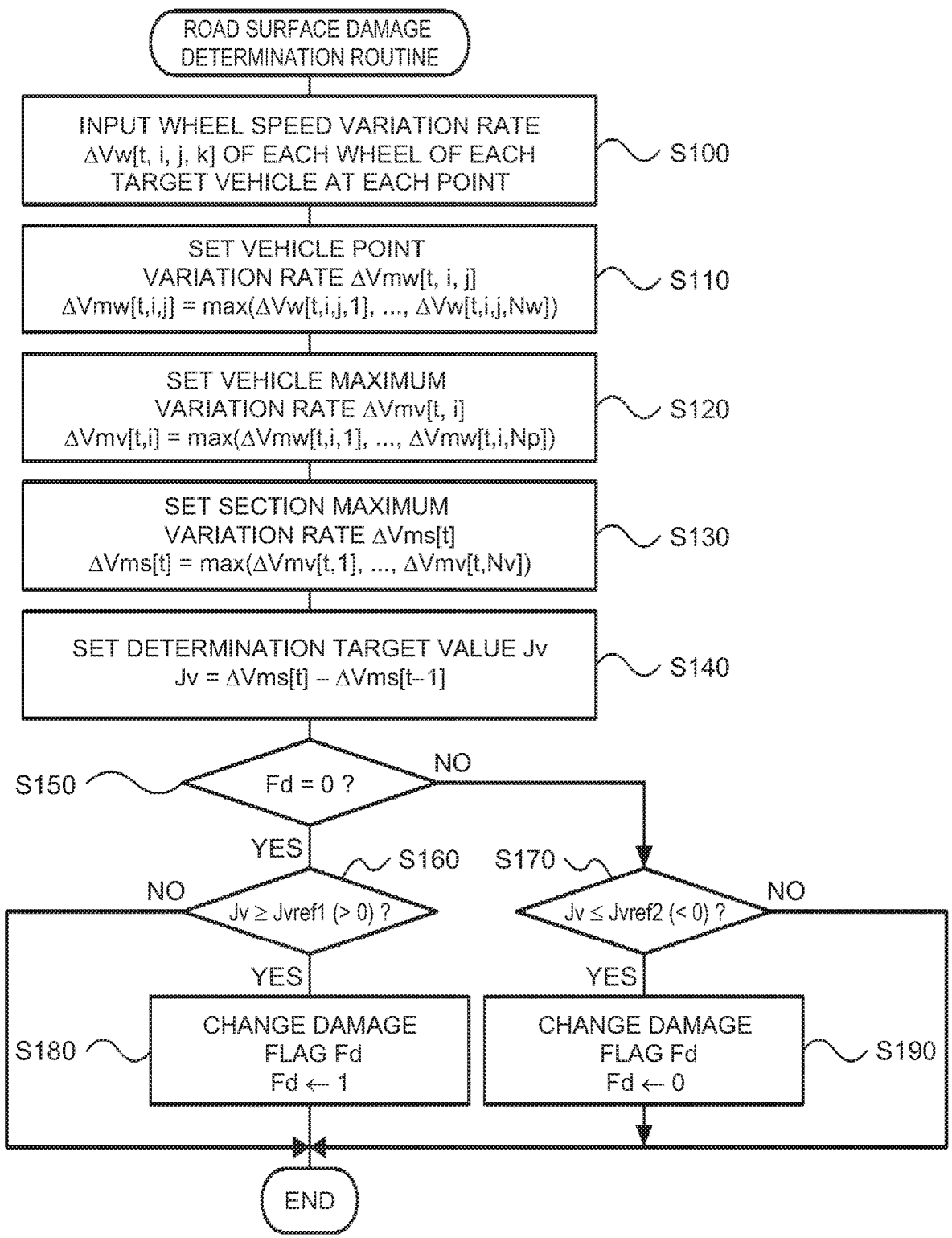
FIG. 2 is a flowchart showing an example of a road surface damage determination routine executed by a road surface damage determiner 23.

Next, description is given of the operation of the thus-configured server 20 of the embodiment, and particularly the operation of the road surface damage determiner 23. FIG. 2 is a flowchart showing an example of a road surface damage determination routine executed by the road surface damage determiner 23. The routine is executed periodically (for example, every day, or every few days) with each of the road sections within the management target range being set as a target section.

When the road surface damage determination routine of FIG. 2 is executed, the road surface damage determiner 23 first inputs a wheel speed variation rate (variation amount of wheel speed per unit time) of each wheel $\Delta Vw[t, i, j, k]$ (i:1 to Nv, j:1 to Np, k:1 to Nw) in each of the vehicles 50 that have traveled in a target section in a prescribed period (hereinafter, referred to as "target vehicles"), at every point (minute section) in the target section (step S100).

Here, the "prescribed period" is defined in accordance with an execution interval of the present routine. When the present routine is executed every day, the "prescribed period" is defined as one day (24 hours) before the present routine is executed, for example. The "each wheel" corresponds to a left front wheel, a right front wheel, a left rear wheel, and a right rear wheel in the case of the vehicle 50 configured as an automatic four-wheel vehicle, and corresponds to a front wheel and a rear wheel in the case of the vehicle 50 configured as a motorcycle.

The variable t is a variable corresponding to an execution date (date) of the present routine. The variable i is a variable corresponding to each target vehicle. The variable j is a variable corresponding to each point. The variable k is a variable corresponding to each wheel. The value Nv is the number of target vehicles (hereinafter referred to as "the number of targets"). The value Np is the number of points in the target section. The value Nw is the number of wheels in each target vehicle.

When data is input in this way, as expressed by an expression (1), the road surface damage determiner 23 selects a maximum value out of the wheel speed variation rates $\Delta Vw[t, i, j, 1]$ to $\Delta Vw[t, i, j, Nw]$ of each wheel at each point for each target vehicle, and sets the selected value as a vehicle point variation rate $\Delta Vmw[t, i, j]$ at each point (step S110).

$$\Delta Vmw[t,j]=\max(\Delta Vw[t,i,j,1], \ldots ,\Delta Vm[t,i,j,Nw]) \quad (1)$$

Next, as expressed by expression (2), the road surface damage determiner 23 selects a maximum value out of the vehicle point variation rates ΔVmw[t, i, 1] to ΔVmw[t, i, Np] at each point for each target vehicle, and sets the selected value as a vehicle maximum variation rate ΔVmv[t, i] in the target section (step S120).

$$\Delta Vmv[t,i] = \max(\Delta Vmw[t,i,1], \ldots, \Delta Vmw1[t,i,Np]) \quad (2)$$

Then, as expressed by expression (3), the road surface damage determiner 23 selects a maximum value out of the vehicle maximum variation rates ΔVmv[t, 1] to ΔVmv[t, Nv] in the target section for each target vehicle, and sets the selected value as a section maximum variation rate ΔVms[t] in the target section for all the target vehicles (step S130).

$$\Delta Vms[t] = \max(\Delta Vmv[1], \ldots, \Delta Vmv[t,Nv]) \quad (3)$$

Next, the road surface damage determiner 23 sets a value, obtained by subtracting a section maximum variation rate ΔVms[t−1] set when the present routine was executed last time from the section maximum variation rate ΔVms[t] this time, as a determination target value Jv (step S140), and checks the value of a damage flag Fd (step S150). Here, the damage flag Fd is a flag indicating whether or not a road surface damage has occurred in the target section. When operation of the server 20 for the target section is started, the damage flag Fd is set to a value zero as an initial value.

When the damage flag Fd has the value zero in step S150, the road surface damage determiner 23 determines that the road surface damage has not occurred in the target section when the present routine was executed last time, and compares the determination target value Jv with a positive threshold Jvref1 (step S160). Here, the threshold Jvref1 is a threshold used for determining whether or not the road surface damage has occurred in the target section. The threshold Jvref1 is set based on analysis or an experiment in advance. As the threshold Jvref1, an identical value may be used, or different values may be used in each of the road sections.

When a road surface damage occurs in the target section, the vehicle maximum variation rate ΔVmv[t, i] of the target vehicle that is influenced by the road surface damage is reflected upon the section maximum variation rate ΔVms[t]. Accordingly, the section maximum variation rate ΔVms[t] of this time increases largely as compared with before the road surface damage occurs (the section maximum variation rate ΔVms[t−1] of last time), and the determination target value Jv also increases largely. The process of step S160 is performed in consideration of this increase.

When the determination target value Jv is less than the threshold Jvref1 in step S160, the road surface damage determiner 23 determines that the road surface damage has not occurred in the target section, and ends the present routine while keeping the damage flag Fd at the value zero. When the present routine is ended in this way, the road surface damage determiner 23 stores in the storage device 28 the date of executing the present routine, the road section set as the target section, the vehicle maximum variation rate ΔVmv[t, i], the section maximum variation rate ΔVms[t], and the damage flag Fd in association with each other.

When the determination target value Jv is equal to or greater than the thresholds Jvref1 in step S160, the road surface damage determiner 23 determines that the road surface damage has occurred, changes the damage flag Fd from the value zero to the value one (step S180), and ends the present routine. A time-series change of the section maximum variation rate ΔVms (a change amount in the section maximum variation rate ΔVms[t] of this time with respect to the section maximum variation rate ΔVms[t−1] of last time) is reflected upon the determination target value Jv. Accordingly, when an unexpected road surface damage, such as a pothole, occurs in the target section, the road surface damage can appropriately be detected.

Thus, when the road surface damage determiner 23 determines that the road surface damage has occurred at least in one section out of the respective road sections included in the management target range, the information provider 24 prepares a list, or the like, of the road sections where the road surface damage has occurred, and transmits the list, or the like, to the terminal device 40. Accordingly, a user (for example, a person in charge of a government office, etc.) who operates the terminal device 40 can check the road sections where the road surface damage has occurred. As a result, a construction dealer, or the like, commissioned by the user can repair the road surface damage.

When the damage flag Fd has the value one in step S150, the road surface damage determiner 23 determines that the road surface damage has occurred in the target section when the present routine was executed last time, and compares the determination target value Jv with a negative threshold Jvref2 (step S170). Here, the threshold Jvref2 is a threshold used for determining whether or not the road surface damage that has occurred in the target section is eliminated. The threshold Jvref2 is determined based on analysis or an experiment in advance. As the threshold Jvref2, an identical value may be used, or different values may be used in each of the road sections.

When the road surface damage that has occurred in the target section is repaired by the construction dealer, or the like, and eliminated, the section maximum variation rate ΔVms[t] of this time decreases largely as compared with before the road surface damage is eliminated (the section maximum variation rate ΔVms[t−1] of last time), and the determination target value Jv also decreases largely (becomes a large value on a negative side). The process of step S170 is performed in consideration of the decrease.

When the determination target value Jv is larger than the threshold Jvref2 in step S170, the road surface damage determiner 23 determines that the road surface damage that has occurred in the target section is not eliminated, and ends the present routine while keeping the damage flag Fd at the value one. Contrary to this, when the determination target value Jv is equal to or smaller than the thresholds Jvref2, the road surface damage determiner 23 determines that the road surface damage that has occurred in the target section is eliminated, changes the damage flag Fd from the value one to the value zero (step S190), and ends the present routine. A time-series change in the section maximum variation rate ΔVms (a change amount of the section maximum variation rate ΔVms[t] of this time with respect to the section maximum variation rate ΔVms[t−1] of last time) is reflected upon the determination target value Jv. Accordingly, when the road surface damage that has occurred in the target section is eliminated, it is possible to appropriately detect the elimination.

Figure 3:
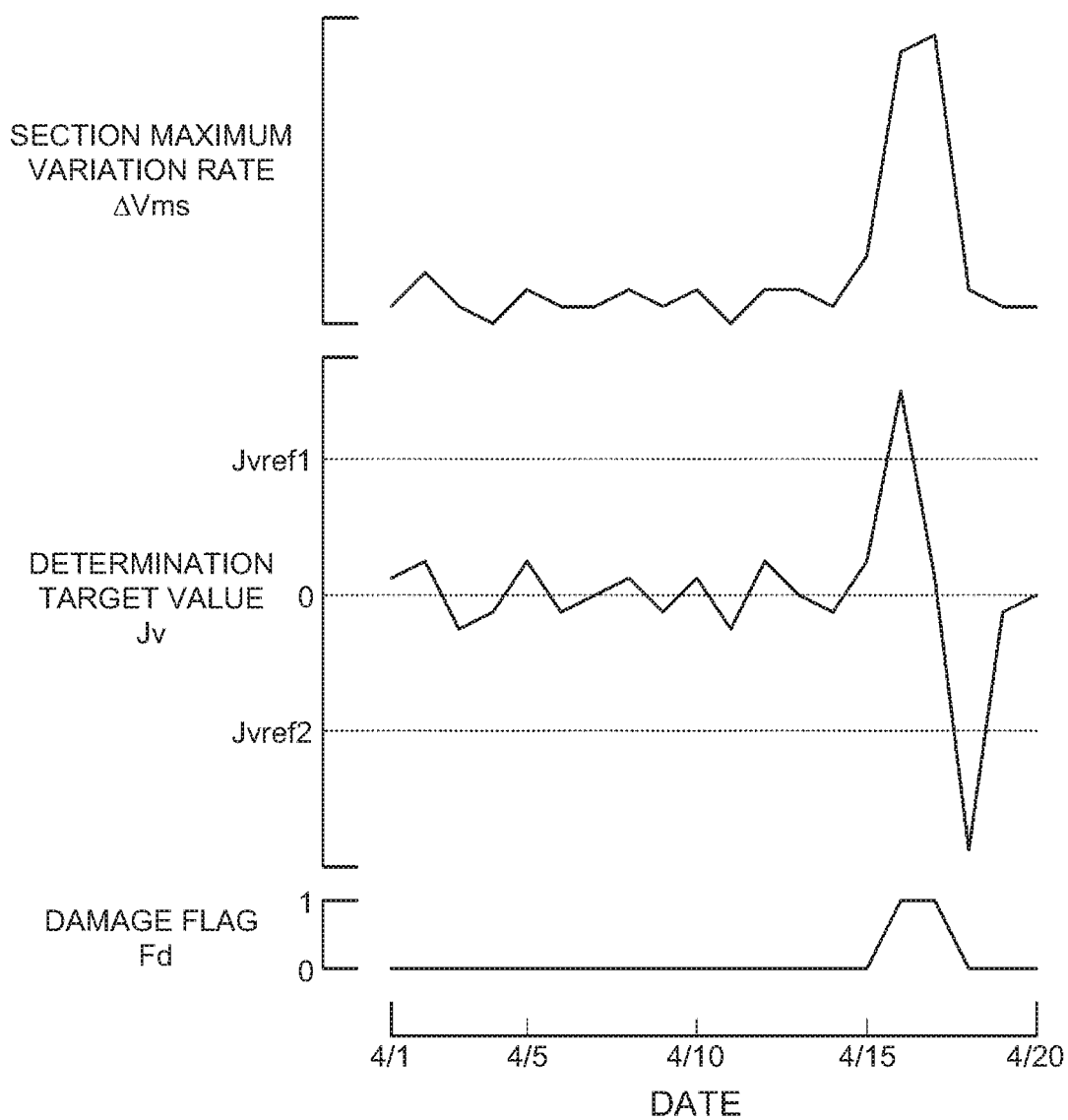
FIG. 3 is an explanatory view showing examples of a section maximum variation rate $\Delta Vms$ and a determination target value Jv of each date.

FIG. 3 is an explanatory view showing examples of the section maximum variation rate ΔVms and the determination target value Jv of each date. In the example of FIG. 3, on April 16, the section maximum variation rate ΔVms increases largely as compared with the previous day, and the determination target value Jv becomes equal to or greater than the threshold Jvref1. Accordingly, the server 20 determines that the road surface damage has occurred, and changes the damage flag Fd from the value zero to the value one. In this case, the server 20 transmits a list, or the like, of the road sections where the road surface damage has occurred to the terminal device 40. Hence, the road surface damage is repaired by a construction dealer, or the like, who is commissioned by the user who operated the terminal device 40. Then, on April 18, the section maximum variation rate ΔVms decreases largely as compared with the previous day, and the determination target value Jv becomes equal to or less than the threshold Jvref2. Accordingly, the server 20 determines that the road surface damage is eliminated, and changes the damage flag Fd from the value one to the value zero.

The server 20, serving as the road surface damage detection device of the embodiment described in the foregoing, determines that the road surface damage has occurred in each of the road sections within the management target range, when the determination target value Jv is equal to or greater than the threshold Jvref1, the determination target value Jv being obtained by subtracting the section maximum variation rate ΔVms[t−1] of last time from the section maximum variation rate ΔVms[t] of this time. Accordingly, when an unexpected road surface damage, such as a pothole, occurs, the road surface damage can appropriately be detected. When the determination target value Jv becomes equal to or less than the threshold Jvref2 in each of the road sections after the road surface damage is detected, the server 20 determines that the road surface damage is eliminated. Therefore, when the road surface damage is eliminated, the elimination can be detected more appropriately.

In the server 20 of the embodiment, the road surface damage determiner 23 executes the road surface damage determination routine of FIG. 2. However, the road surface damage determiner 23 may execute any one of the road surface damage determination routines of FIGS. 4 to 6 instead. These road surface damage determination routines will be described below in order.

The road surface damage determination routine of FIG. 4 will be described. The routine is the same as the road surface damage determination routine of FIG. 2 except for the point that the process of step S140 is replaced with the process of steps S300, S310. Therefore, the processes in the road surface damage determination routine of FIG. 4, which are the same as those in the road surface damage determination routine of FIG. 2, are designated by the same step numbers, and a detailed description thereof is omitted.

Figure 4:
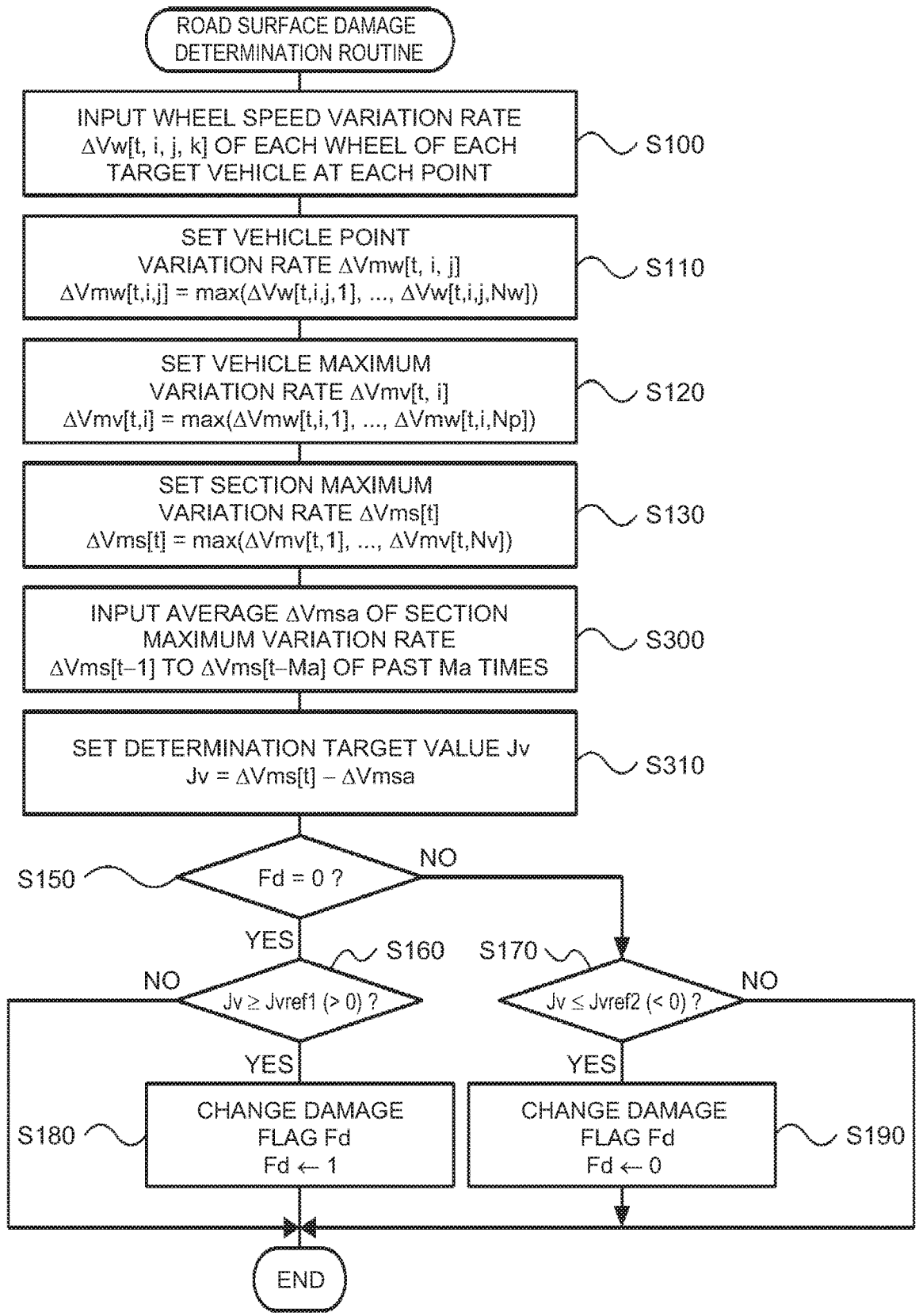
FIG. 4 is a flowchart showing an example of the road surface damage determination routine in a modification.

In the road surface damage determination routine of FIG. 4, when the section maximum variation rate ΔVms[t] of this time is set in step S130, the road surface damage determiner 23 inputs an average ΔVmsa of the section maximum variation rates ΔVms[t−1] to ΔVms[t−Ma] of past Ma times (step S300). Here, as the value Ma, values such as 7, 10, and 14, are used, for example. As expressed by an expression (4), the average ΔVmsa is obtained as a value resulting from dividing a sum total of the section maximum variation rates ΔVms[t−1] to ΔVms[t−Ma], set when the present routine was executed during the period from the last time (one time before) to Ma times before, by the value Ma.

$$\Delta Vmsa=(\Delta Vms[t-1]+\ldots+\Delta Vms[t-Ma])/Ma \quad (4)$$

Next, the road surface damage determiner 23 sets a value, obtained by subtracting the input average ΔVmsa from the section maximum variation rate ΔVms[t] of this time, as the determination target value Jv (step S310), and executes the process in and subsequent to step S150. In this case as in the embodiment, when an unexpected road surface damage, such as a pothole, occurs in each of the road sections, the road surface damage can appropriately be detected.

The road surface damage determination routine of FIG. 5 will be described. The routine is the same as the road surface damage determination routine of FIG. 2 except for the point that the process of step S140 is replaced with the process of steps S400, S410. Therefore, the processes in the road surface damage determination routine of FIG. 5, which are the same as those in the road surface damage determination routine of FIG. 2, are designated by the same step numbers, and a detailed description thereof is omitted.

Figure 5:
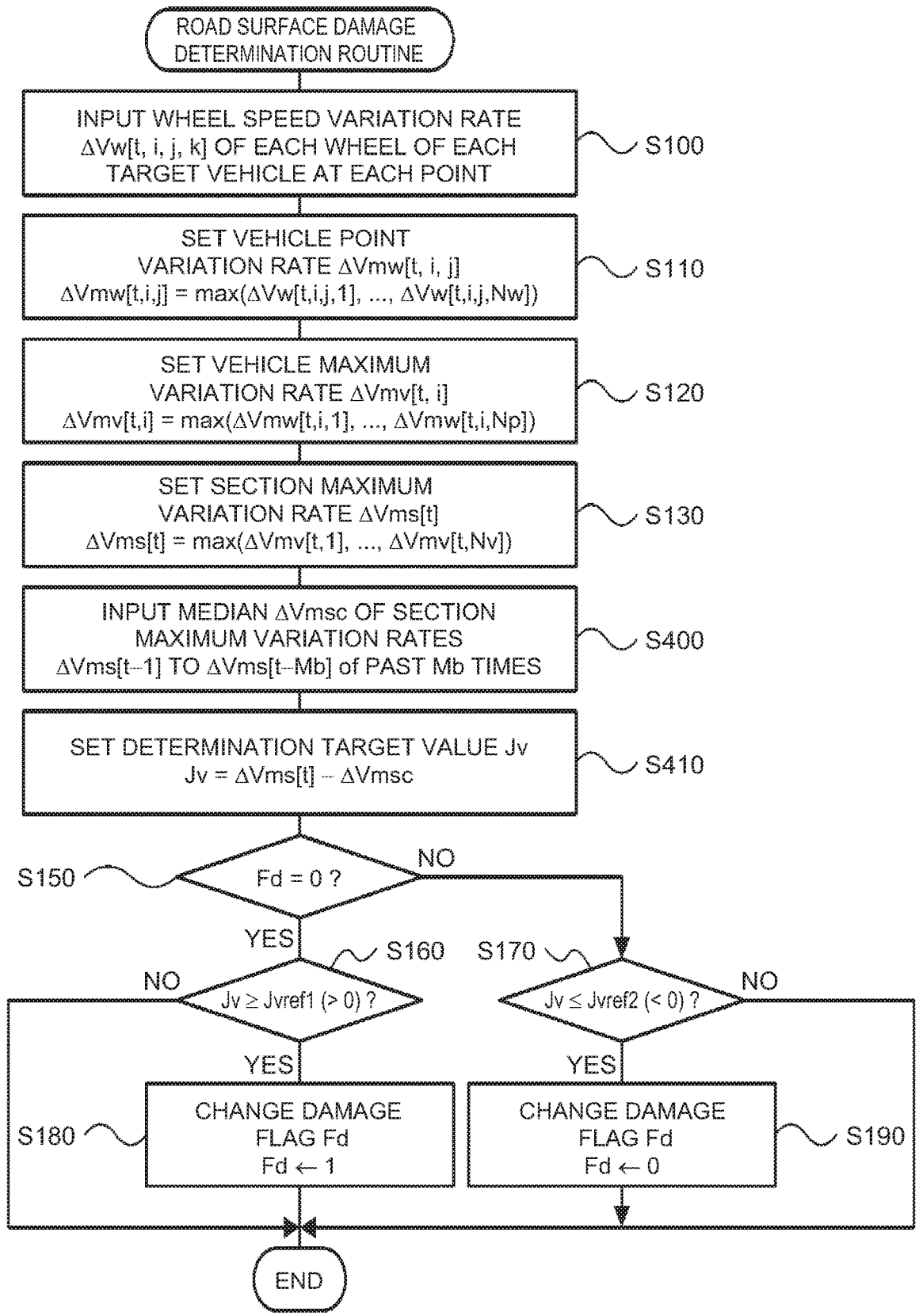
FIG. 5 is a flowchart showing an example of the road surface damage determination routine in a modification.

In the road surface damage determination routine of FIG. 5, when the section maximum variation rate ΔVms[t] of this time is set in step S130, the road surface damage determiner 23 inputs a median ΔVmsc of the section maximum variation rates ΔVms[t−1] to ΔVms[t−Mb] of the past Mb times (step S400). Here, as the value Mb, values such as 7, 10, and 14, are used, for example.

Next, the road surface damage determiner 23 sets a value, obtained by subtracting the input median ΔVmsc from the section maximum variation rate ΔVms[t] of this time, as the determination target value Jv (step S410), and executes the process in and subsequent to step S150. In this case as in the embodiment, when an unexpected road surface damage, such as a pothole, occurs in each of the road sections, the road surface damage can appropriately be detected.

In the road surface damage determination routines of FIGS. 4 and 5, when the determination target value Jv is equal to or greater than the threshold Jvref1 with the damage flag Fd having the value zero, the road surface damage determiner 23 determines that the road surface damage has occurred in the target section, and changes the damage flag Fd to the value one. However, when the determination that the determination target value Jv is equal to or greater than the threshold Jvref1 is continuously made a prescribed number of times while the damage flag Fd has the value zero, the road surface damage determiner 23 may determine (concludes) that the road surface damage has occurred in the target section, and change the damage flag Fd to the value one. Here, the prescribed number of times is a threshold used for making a conclusion that the road surface damage has occurred in the target section. The threshold is determined based on analysis or an experiment in advance. As the prescribed number of times, values such as 2 and 3 are used, for example. Such a process can reduce erroneous detection of the road surface damage in the target section.

The road surface damage determination routine of FIG. 6 will be described. The routine is the same as the road surface damage determination routine of FIG. 2 except for the point that the process of step S140 is replaced with the process of steps S500, S510. Therefore, the processes in the road surface damage determination routine of FIG. 6, which are the same as those in the road surface damage determination routine of FIG. 2, are designated by the same step numbers, and a detailed description thereof is omitted.

Figure 6:
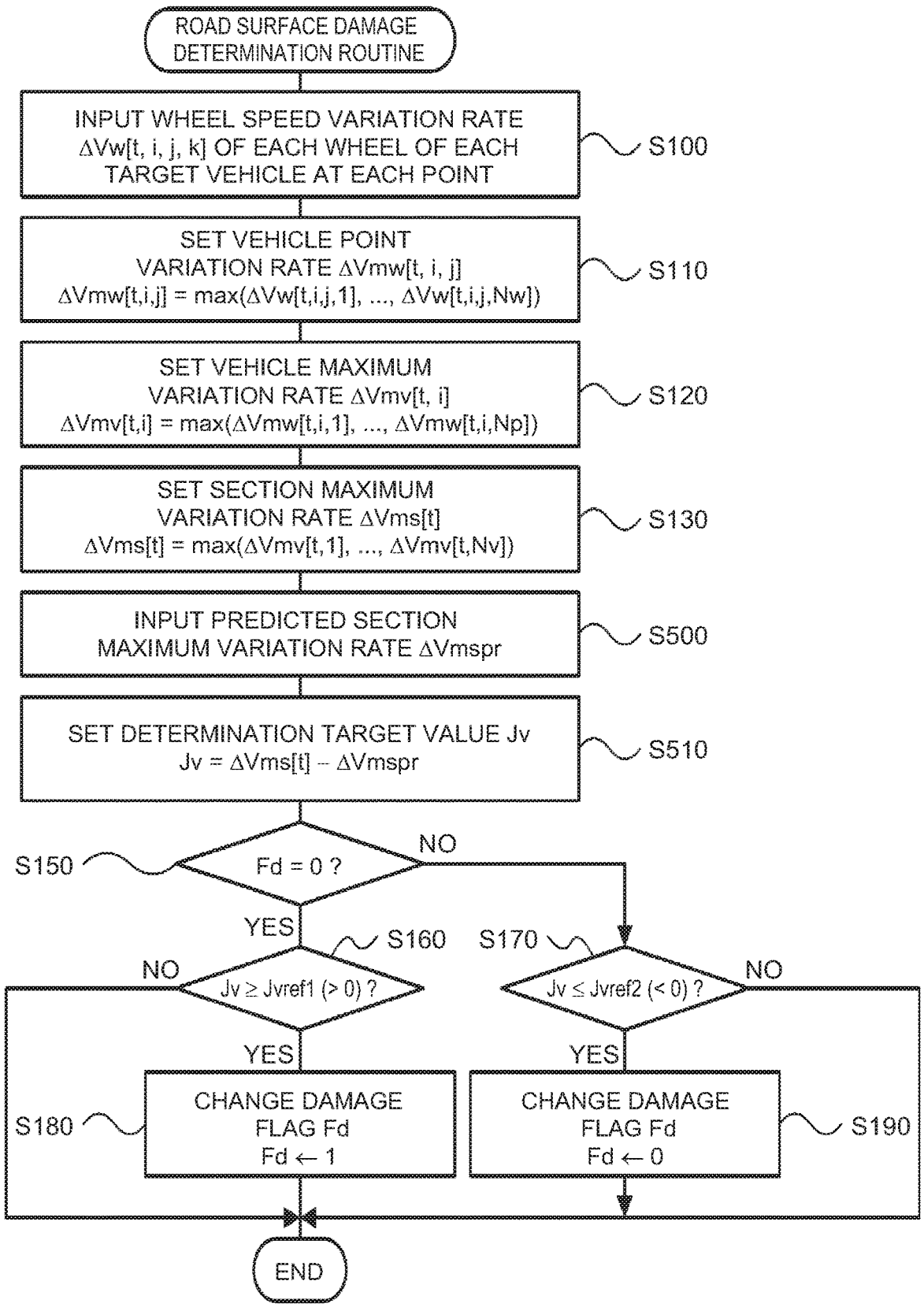
FIG. 6 is a flowchart showing an example of the road surface damage determination routine in a modification.

In the road surface damage determination routine of FIG. 6, when the section maximum variation rate ΔVms[t] of this time is set in step S130, the road surface damage determiner 23 inputs a predicted section maximum variation rate ΔVmspr (step 500). Here, the predicted section maximum variation rate ΔVmspr is a predicted value of the section maximum variation rate of this time, based on time series data of the section maximum variation rates ΔVms[t−1] to ΔVms[t−Mc] of the past Mc times. The predicted section maximum variation rate ΔVmspr may be calculated using a weighted mean, a moving average, or the like. The predicted section maximum variation rate ΔVmspr may also be calculated using a long short-term memory (LSTM) network or the like. As the value Mc, the number of times that the present routine is executed until the present routine is executed this time after operation of the server 20 is started in the target section, or values such as 10, 20, and 30, are used, for example.

Next, the road surface damage determiner 23 sets a value, obtained by subtracting the predicted section maximum variation rate ΔVmspr from the section maximum variation rate ΔVms[t] of this time, as the determination target value Jv (step S510), and executes the process in and subsequent to step S150. In this case as in the embodiment, when an unexpected road surface damage, such as a pothole, occurs in each of the road sections, the road surface damage can appropriately be detected.

Figure 7:
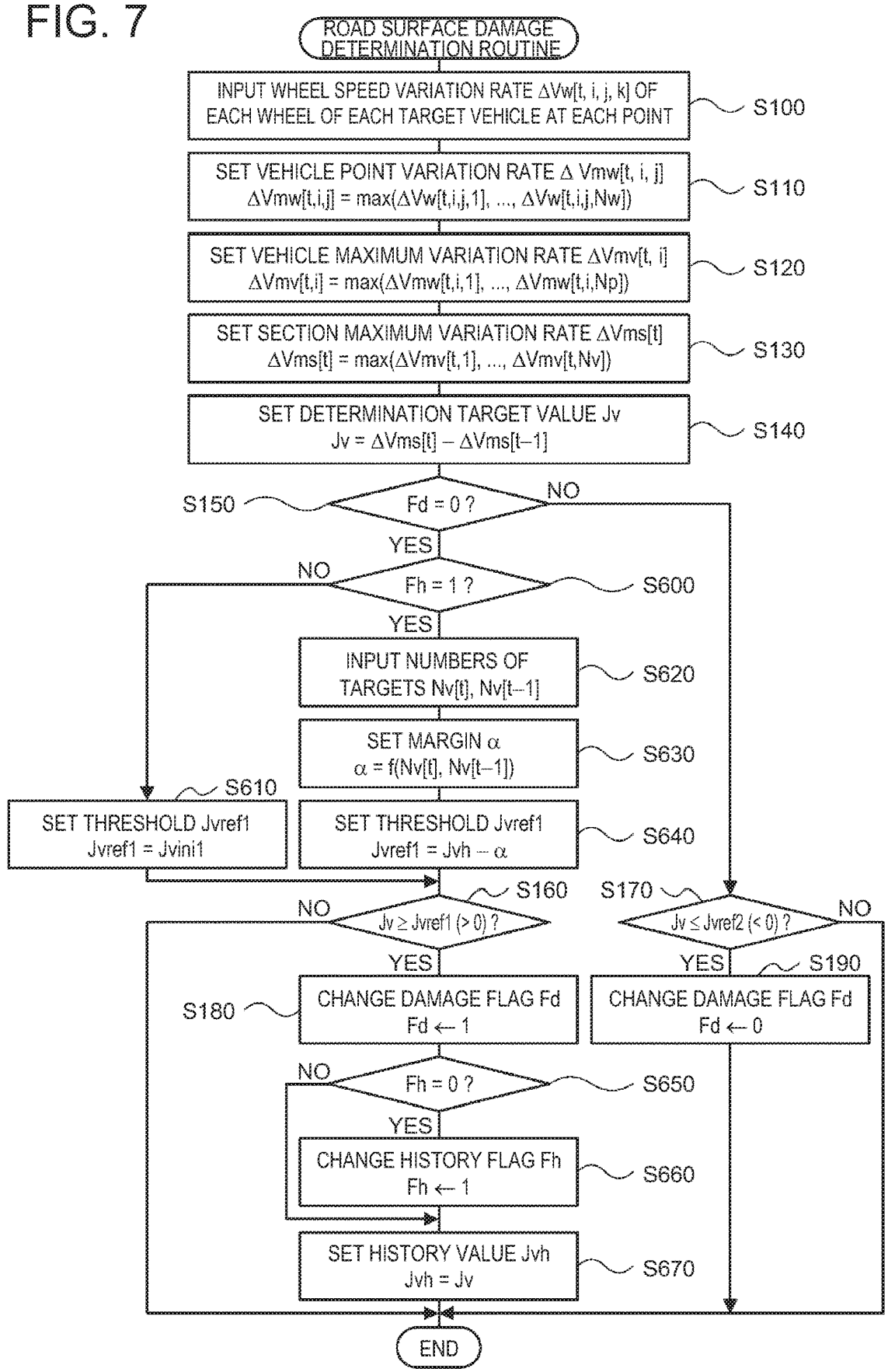
FIG. 7 is a flowchart showing an example of the road surface damage determination routine in a modification.

In the server 20 of the embodiment, the road surface damage determiner 23 executes the road surface damage determination routine of FIG. 2. However, the server 20 may execute a road surface damage determination routine of FIG. 7 instead. The road surface damage determination routine of FIG. 7 is the same as the road surface damage determination routine of FIG. 2 except for the point that steps S600 to S670 are added. Therefore, the processes in the road surface damage determination routine of FIG. 7, which are the same as those in the road surface damage determination routine of FIG. 2, are designated by the same step numbers, and a detailed description thereof is omitted.

In the road surface damage determination routine of FIG. 7, the road surface damage determiner 23 checks the value of a history flag Fh, when the damage flag Fd has the value zero in step S150 (step S600). Here, the history flag Fh is a flag indicating whether or not there is a history of the present routine detecting any road surface damage in the target section (the damage flag Fd being changed from the value zero to the value one). The history flag Fh is set to a value zero as an initial value when operation of the server 20 is started in the target section. When the present routine detects the road surface damage in the target section after that, the history flag Fh is set to a value one by the process of step S660 described later.

When the history flag Fh has the value zero in step S600, the road surface damage determiner 23 determines that there is no history of the present routine detecting the road surface damage in the target section, and sets an initial value Jvini1 as the threshold Jvref1 (step S610). Here, as the initial value Jvini1, values determined based on analysis or an experiment in advance are used. Next, the road surface damage determiner 23 compares the determination target value Jv with the threshold Jvref1 (step S160), and when the determination target value Jv is less than the threshold Jvref1, the road surface damage determiner 23 ends the present routine.

When the determination target value Jv is equal to or greater than the threshold Jvref1 in step S160, the road surface damage determiner 23 changes the damage flag Fd from the value zero to the value one (step S180), and checks the value of the history flag Fh (step S650). When the history flag Fh has the value zero, the road surface damage determiner 23 determines that there is no history of the present routine detecting the road surface damage in the target section (the road surface damage is detected for the first time), and changes the history flag Fh to the value one (step S660). When the history flag Fh has the value one, the road surface damage determiner 23 determines that there is a history, and keeps the history. Then, the road surface damage determiner 23 sets the determination target value Jv to the history value Jvh (step S670), and ends the present routine.

By such a process, the history flag Fh is switched from the value zero to the value one, when the present routine detects the road surface damage in the target section for the first time. The history value Jvh is updated whenever the present routine detects the road surface damage in the target section (whenever the damage flag Fd is changed from the value zero to the value one). When the history value Jvh is set in this way, the road surface damage determiner 23 stores, in the storage device 28, the road section set as the target section and the history value Jvh in association with each other.

When the history flag Fh has the value one in step S600, the road surface damage determiner 23 determines that there is a history of the present routine detecting the road surface damage in the target section, and inputs the numbers of targets Nv[t], Nv[t−1] used for setting the section maximum variation rates ΔVms[t], ΔVms[t−1] when the present routine was executed this time and last time (step S620).

Figure 8:
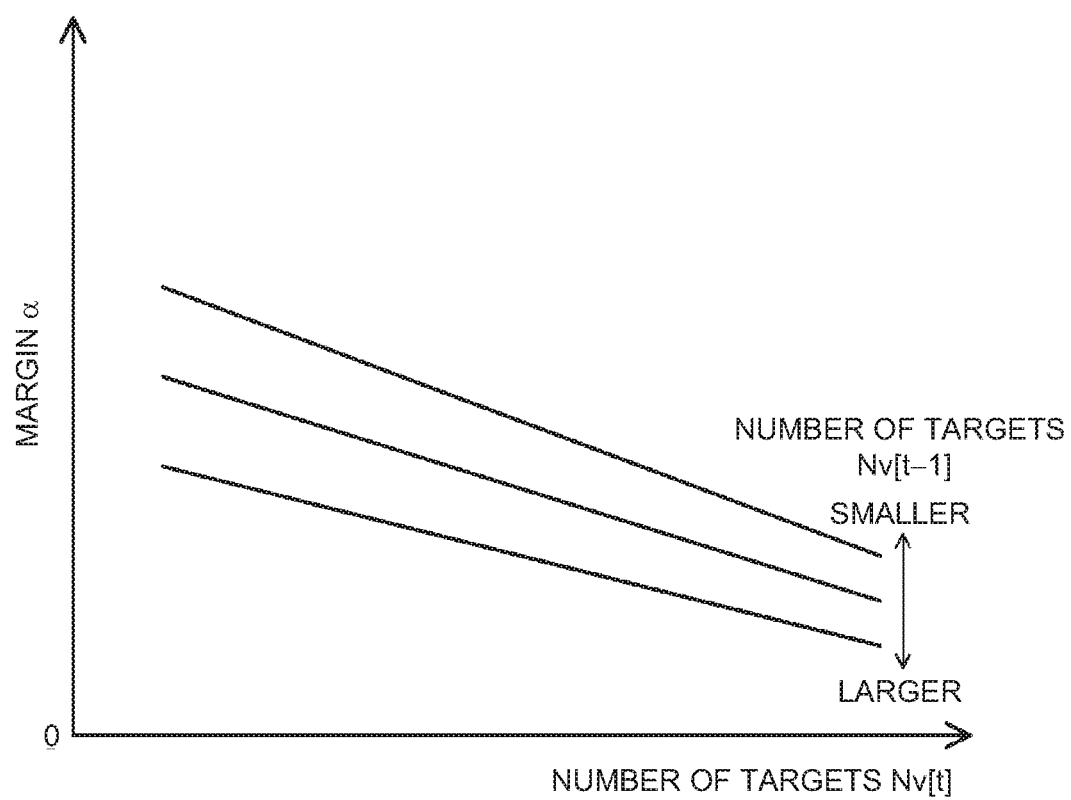
FIG. 8 is an explanatory view showing an example of the relationship between the numbers of target vehicles Nv[t], Nv[t−1] of this time and last time, and a margin α.

Next, the road surface damage determiner 23 sets a margin α by using the numbers of targets Nv[t], Nv[t−1] of this time and last time, and a margin setting map of FIG. 8 (step S630). Then, the road surface damage determiner 23 sets a value, obtained by subtracting the margin α from the history value Jvh set when the present routine was executed before last time, as the threshold Jvref1 (step S640), and executes the process in and subsequent to step S160.

The margin setting map of FIG. 8 is determined in advance as the relationship between the numbers of targets Nv[t], Nv[t−1] of this time and last time and the margin α. The margin setting map is stored in the ROM (illustration omitted) of the arithmetic processing unit 21 or the storage device 28. As shown in the drawing, the margin α is set to be smaller as the numbers of targets Nv[t], Nv[t−1] of this time and last time are larger. Therefore, the threshold Jvref1 becomes closer to the history value Jvh as the numbers of targets Nv[t], Nv[t−1] of this time and last time are larger. This is because as the numbers of targets Nv[t], Nv[t−1] of this time and last time become larger, statistical certainty of the section maximum variation rates ΔVms[t], ΔVms[t−1] of this time and last time become higher, i.e., statistical certainty of the determination target value Jv becomes higher, as a result of which it is considered that the threshold Jvref1 can be made closer to the history value Jvh.

Since the value obtained by subtracting the margin α from the history value Jvh is set as the threshold Jvref1 in this way, a more appropriate threshold Jvref1 can be set for each of the road sections by utilizing the history of past detection of the road surface damage. Since the margin α is set such that as the numbers of targets Nv[t], Nv[t−1] of this time and last time become larger, the margin α becomes smaller, it is possible to set the threshold Jvref1 more appropriately than the case of using a fixed value as the margin α. As a result, when an unexpected road surface damage, such as a pothole, occurs in each of the road sections, the road surface damage can appropriately be detected as compared with the embodiment.

In the road surface damage determination routine of FIG. 7, the margin α is set for the target section, based on the numbers of targets Nv[t], Nv[t−1] of this time and last time. However, the margin α may be set based on any one of the numbers of targets Nv[t], Nv[t−1] of this time and last time. A fixed value may also be used as the margin α.

In the road surface damage determination routine of FIG. 7, when the road surface damage in the target section is detected (when the damage flag Fd is changed from the value zero to the value one), the determination target value Jv at that time is set as the history value Jvh. However, when the road surface damage in the target section is detected, a smaller one of the determination target value Jv at that time and the history value of the last time (previous Jvh) may be set as the history value Jvh.

In the road surface damage determination routine of FIG. 7, the determination target value Jv when the road surface damage in the target section is detected (when the damage flag Fd is changed from the value zero to the value one) is set as the history value Jvh, and the threshold Jvref1 is set based on the history value Jvh. Similarly, the determination target value Jv when the road surface damage in the target section is eliminated (when the damage flag Fd is changed from the value one to the value zero) is set as a history value Jvh2, and the threshold Jvref2 may be set based on the history value Jvh2.

In the road surface damage determination routine of FIG. 7, a first setting process that is to set a value, obtained by subtracting the margin α from the history value Jvh, as the threshold Jvref1 is added to the road surface damage determination routine of FIG. 2. Similarly, the first setting process may be added to each of the road surface damage determination routine of FIGS. 4 to 6.

Here, in the case of adding the first setting process to the road surface damage determination routine of FIG. 4, the margin α may be set to be smaller, as one of or both the number of targets Nv[t] of this time and the number of vehicles used for calculation of the average ΔVmsa (the sum total of the numbers of targets Nv[t−1] to Nv[t−Ma] of the past Ma times) become larger. A fixed value may also be used as the margin α.

In the case of adding the first setting process to the road surface damage determination routine of FIG. 5, the margin α may be set to be smaller, as one of or both the number of targets Nv[t] of this time and the number of vehicles used for setting the median ΔVmsc (the sum total of the numbers of targets Nv[t−1] to Nv[t−Mb] of the past Mb times) become larger as in the case of FIG. 7. A fixed value may also be used as the margin α.

Furthermore, in the case of adding the first setting process to the road surface damage determination routine of FIG. 6, the margin α may be set to be smaller, as one of or both the number of targets Nv[t] of this time and the number of vehicles used for setting the predicted section maximum variation rate ΔVmspr (the sum total of the numbers of targets Nv[t−1] to Nv[t−Mc] of past Mc times) become larger as in the case of FIG. 7. A fixed value may also be used as the margin α.

Figure 9:
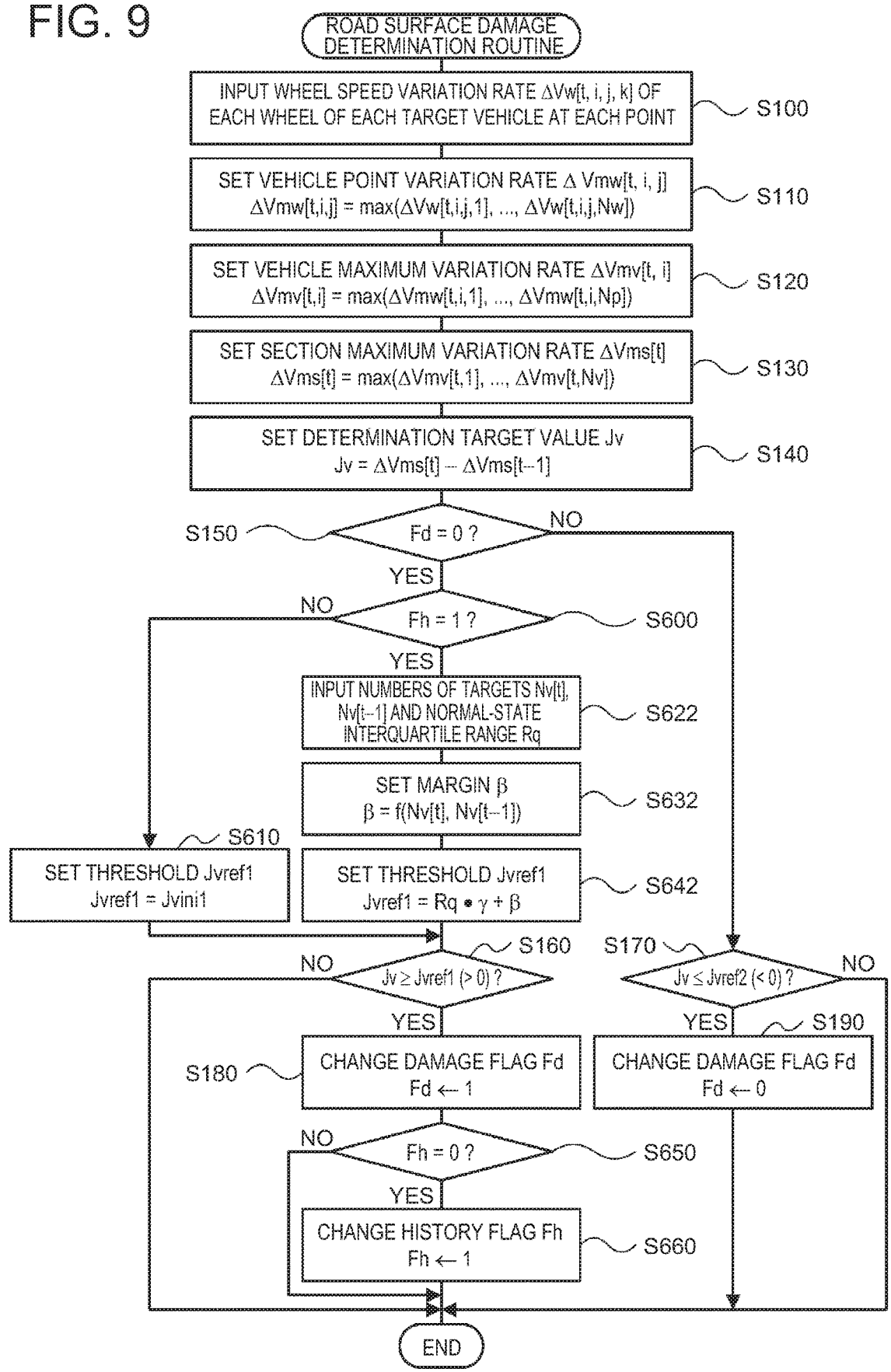
FIG. 9 is a flowchart showing an example of the road surface damage determination routine in a modification.

In the server 20 of the modification, the road surface damage determiner 23 executes the road surface damage determination routine of FIG. 7. However, the server 20 may execute a road surface damage determination routine of FIG. 9 instead. The road surface damage determination routine of FIG. 9 is the same as that of the road surface damage determination routine of FIG. 7 except for the point that the processes of steps S622, S632, S642 are executed instead of the processes of steps S620, S630, S640 and for the point that the process of step S670 is removed. Therefore, the processes in the road surface damage determination routine of FIG. 9, which are the same as those in the road surface damage determination routine of FIG. 7, are designated by the same step numbers, and a detailed description thereof is omitted.

In the road surface damage determination routine of FIG. 9, when the history flag Fh is set to the value one in step S600, the road surface damage determiner 23 inputs a normal-state interquartile range Rq, in addition to the numbers of targets Nv[t], Nv[t−1] used for setting the section maximum variation rates ΔVms[t], ΔVms[t−1] when the present routine was executed this time and last time (step S622).

Figure 10:
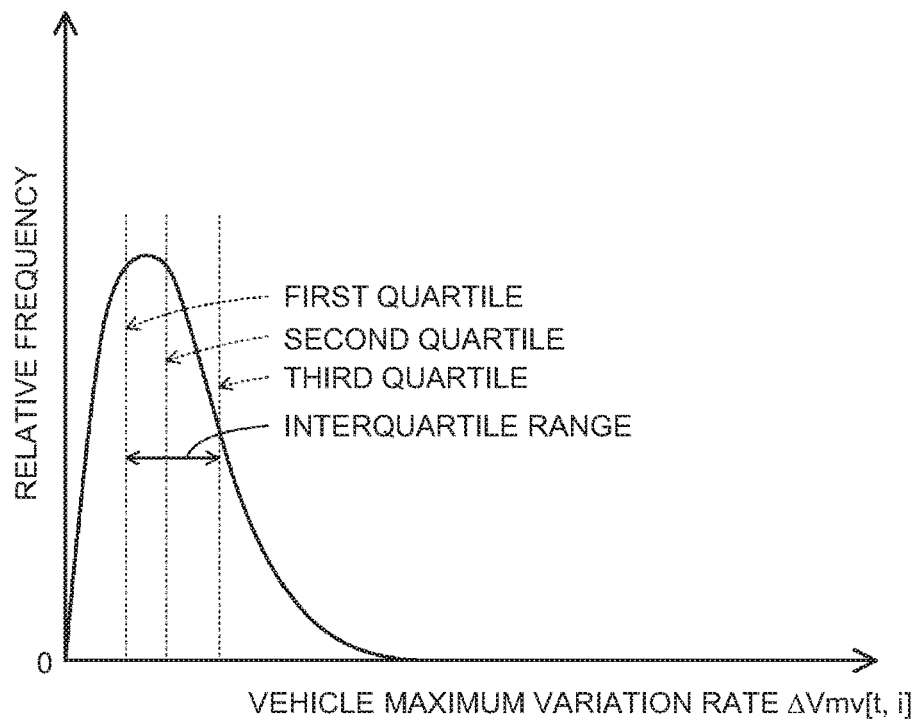
FIG. 10 is an explanatory view showing an example of the relationship between a vehicle maximum variation rate $\Delta Vmv[t, i]$ and relative frequency.

Here, input as the normal-state interquartile range Rq is a value calculated using all the vehicle maximum variation rates ΔVmv [t, i] of all the dates, until the present routine is executed this time after operation of the server 20 is started for the target section, the dates being determined by the present routine as the dates when no road surface damage has occurred in the target section or when the road surface damage that has occurred is eliminated (the dates when the damage flag Fd has the value zero, which are hereinafter referred to as "normal-state dates"). FIG. 10 is an explanatory view showing an example of the relationship between the vehicle maximum variation rate ΔVmv[t, i] and relative frequency. In the drawing, a "first quartile", a "second quartile", and a "third quartile" are values at positions corresponding to 25%, 50%, and 75% from a lower side of the vehicle maximum variation rate ΔVmv[t, i]. Therefore, the second quartile corresponds to a median. The "interquartile range" is a value obtained by subtracting the first quartile from the third quartile. Based on these, the normal-state interquartile range Rq is obtained by calculating the first quartile and the third quartile using all the vehicle maximum variation rates ΔVmv[t, i] at all the normal-state dates until the present routine is executed after operation of the server 20 is started for the target section, and setting a value obtained by subtracting the first quartile from the third quartile.

Figure 11:
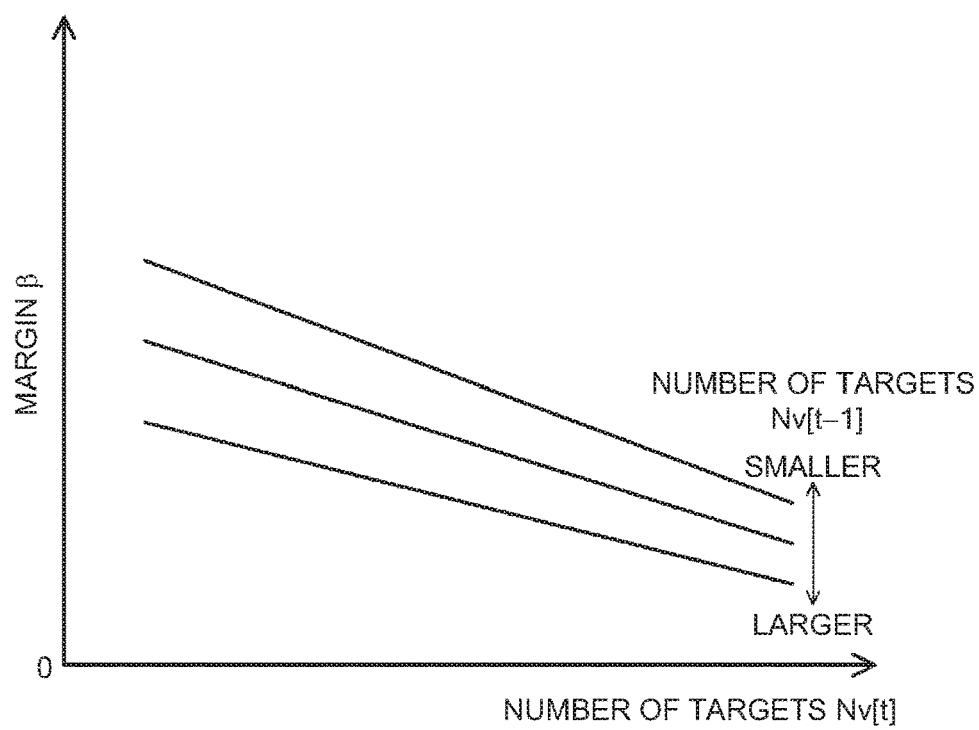
FIG. 11 is an explanatory view showing an example of a margin setting map.

Next, the road surface damage determiner 23 sets a margin β by using the numbers of targets Nv[t], Nv[t−1] of this time and last time, and a margin setting map of FIG. 11 (step S632). Then, the road surface damage determiner 23 sets as the threshold Jvref1 a value obtained by adding the margin β to a prescribed γ-multiple of the normal-state interquartile range Rq (step S642) as expressed by expression (5), and executes the process in and subsequent to step S160. Here, the prescribed γ is properly set.

$$Jvref1 = Rq \cdot \gamma + \beta \quad (5)$$

The margin setting map of FIG. 11 is determined in advance as the relationship between the numbers of targets Nv[t], Nv[t−1] of this time and last time and the margin β. The margin setting map is stored in the ROM (illustration omitted) of the arithmetic processing unit 21 or the storage device 28. As shown in the drawing, the margin β is set to be smaller as the numbers of targets Nv[t], Nv[t−1] of this time and last time are larger. Therefore, the threshold Jvref1 becomes closer to the prescribed γ-multiple of the normal-state interquartile range Rq, as the numbers of targets Nv[t], Nv[t−1] of this time and last time are larger. This is because of the same reason as the tendency (see FIG. 8) of the margin α with respect to the numbers of targets Nv[t], Nv[t−1] of this time and last time.

Since the value obtained by adding the margin β to a prescribed γ-multiple of the normal-state interquartile range Rq is set as the threshold Jvref1 in this way, for the target section, the threshold Jvref1 can be set more appropriately by utilizing all the vehicle maximum variation rates ΔVmv [t, i] at all the normal-state dates until the present routine is executed after operation of the server 20 is started for the target section. Since the margin β is set such that as the numbers of targets Nv[t], Nv[t−1] of this time and last time become larger, the margin β becomes smaller, it is possible to set the threshold Jvref1 still more appropriately as compared with case where a fixed value is used as the margin β. As a result, when an unexpected road surface damage, such as a pothole, occurs in each of the road sections, the road surface damage can appropriately be detected as compared with the embodiment.

In the road surface damage determination routine of FIG. 9, the margin β is set for the target section, based on the numbers of targets Nv[t], Nv[t−1] of this time and last time. However, the margin β may be set based on any one of the numbers of targets Nv[t], Nv[t−1] of this time and last time. A fixed value may also be used as the margin β.

In the road surface damage determination routine of FIG. 9, the interquartile range is set based on all the vehicle maximum variation rates ΔVmv[t, i] at all the normal-state dates until the present routine is executed after operation of the server 20 is started for the target section. However, the interquartile range is set based on all the vehicle maximum variation rates ΔVmv[t, i] at all the normal-state dates in a second prescribed period (for example, one week, two weeks, one month, etc.).

In the road surface damage determination routine of FIG. 9, the threshold Jvref1 is set for the target section, based on the normal-state interquartile range Rq. Similarly, the threshold Jvref2 may be set for the target section, based on the normal-state interquartile range Rq.

In the road surface damage determination routine of FIG. 9, a second setting process that is to set a value, obtained by adding the margin β to a prescribed γ-multiple of the normal-state interquartile range Rq, as the threshold Jvref1 is added to the road surface damage determination routine of FIG. 2. Similarly, the second setting process may be added to each of the road surface damage determination routines of FIGS. 4 to 6.

Here, in the case of adding the second setting process to the road surface damage determination routine of FIG. 4, the margin β may be set to be smaller, as one of or both the number of targets Nv[t] of this time and the number of vehicles used for calculation of the average ΔVmsa (the sum total of the numbers of targets Nv[t−1] to Nv[t−Ma] of the past Ma times) become larger as in the case of FIG. 7 or 9. A fixed value may also be used as the margin β.

In the case of adding the second setting process to the road surface damage determination routine of FIG. 5, the margin β may be set to be smaller, as one of or both the number of targets Nv[t] of this time and the number of vehicles used for setting the median ΔVmsc (the sum total of the numbers of targets Nv[t−1] to Nv[t−Mb] of the past Mb times) become larger as in the case of FIG. 7 or 9. A fixed value may also be used as the margin β.

Furthermore, in the case of adding the second setting process to the road surface damage determination routine of FIG. 6, the margin β may be set to be smaller, as one of or both the number of targets Nv[t] of this time and the number of vehicles used for setting the predicted section maximum variation rate ΔVmspr (the sum total of the number of targets Nv[t−1] to Nv[t−Mc] of the past Mc times) become larger as in the case of FIG. 7 or 9. A fixed value may also be used as the margin β.

In the server 20 of the embodiment, when the damage flag Fd has the value one (the road surface damage has been detected) and the determination target value Jv becomes equal to or less than the threshold Jvref2 for each of the road sections, the road surface damage determiner 23 determines that the road surface damage is eliminated, and changes the damage flag Fd to the value zero. However, in place of or in addition to this configuration, when the damage flag Fd has the value one, and a signal indicating that the repair of the road surface damage is completed is received from a construction dealer, or the like, who repaired the road surface damage, the road surface damage determiner 23 may determine that the road surface damage is eliminated, and may change the damage flag Fd to the value zero.

Figure 12:
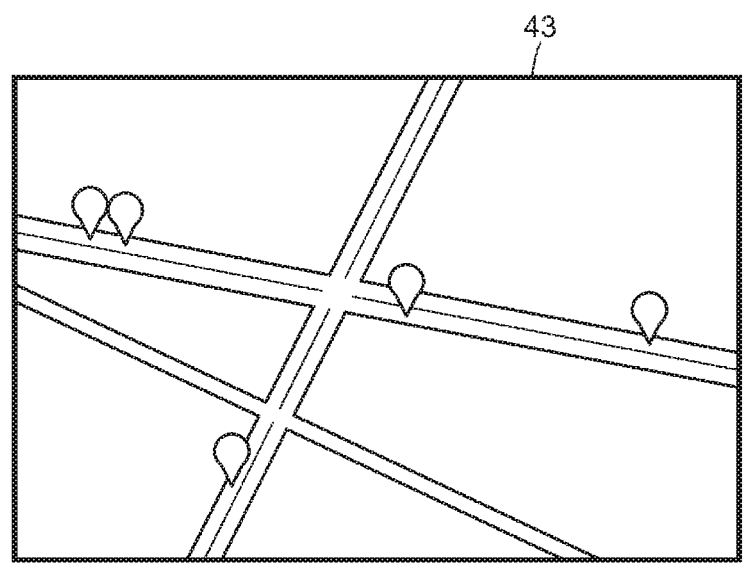
FIG. 12 is an explanatory view showing an example of a display screen of a display 43.

In the server 20 of the embodiment, the information provider 24 prepares a list, or the like, of the road sections where the road surface damage has occurred, and transmits the list, or the like, to the terminal device 40. However, the information provider 24 may execute a following display image process in accordance with operation of the input device 42 by a user (for example, a person in charge of a government office, etc.). In the display image process, the information provider 24 provides a state image (for example, image of pins) relating to the road surface damage to the roads on a display map displayed on the display 43 of the terminal device 40, and transmits the data to the computer 41 of the terminal device 40. Accordingly, the display map and the state image are displayed on the display 43. Here, the display map is defined by a display contraction scale and a display range (for example, all or some of the management target range) desired by the user. FIG. 12 is an explanatory view showing an example of a display screen of the display 43. In the drawing, pins indicate road sections where the road surface damage has occurred. With this configuration, the user who checked the display 43 can easily recognize the road sections where the road surface damage has occurred.

In the embodiment, the present disclosure is applied to the aspects of the server 20 as the road surface damage detection device, and to the aspects as the road surface damage detection method. However, the present disclosure may be applied to the aspects of a program for causing the server 20 to function as the road surface damage detection device.

Correspondence relation between the main elements of the embodiment and the main elements of the present disclosure described in Summary will be described. In the embodiment, the road surface damage determiner 23 corresponds to the "first processor" and the "second processor".

Since the correspondence relation between the main elements of the embodiment and the main elements of the present disclosure described in Summary is an example for specific description of the aspect for carrying out the present disclosure described in Summary, the correspondence relation is not intended to limit the elements of the disclosure described in Summary. More specifically, the disclosure disclosed in Summary should be interpreted based on the description therein, and the embodiments are merely specific examples of the disclosure disclosed in Summary.

Although the aspects for carrying out the present disclosure have been described using the embodiments, the present disclosure is not limited in any manner to the embodiments disclosed. It should naturally be understood that the present disclosure can be carried out in various aspects without departing from the scope of the present disclosure.

The present disclosure is applicable in the fields such as manufacturing of the road surface damage detection device.

What is claimed is:

1. A road surface damage detection device for detecting a road surface damage for each of road sections based on vehicle information from each of vehicles that have traveled, the device comprising:
   a first processor configured to calculate, for each of the road sections, a maximum variation rate for each of a plurality of vehicles, the maximum variation rate being a maximum value of a variation amount of a wheel speed per unit time in each of the vehicles; and
   a second processor configured to periodically select a maximum value from among the maximum variation rates calculated for the plurality of vehicles in a prescribed period for each of the road sections, set the selected maximum value as a section maximum variation rate, and determine whether or not the road surface damage has occurred by comparing a determination target value with a positive threshold, the determination target value being obtained by subtracting a comparison value from a first section maximum variation rate that is the section maximum variation rate set latest by the second processor, the comparison value being based on a fourth section maximum variation rate including at least one of a second section maximum variation rate that is the section maximum variation rate when last set by the second processor or a third section maximum variation rate that is the section maximum variation rate that is set before the second processor sets the second section maximum variation rate, wherein the second processor sets the second section maximum variation rate as the comparison value.

2. The road surface damage detection device according to claim 1, wherein the second processor sets an average or an intermediate value of the fourth section maximum variation rate as the comparison value.

3. The road surface damage detection device according to claim 1, wherein the second processor sets a predicted value of the first section maximum variation rate based on the fourth section maximum variation rate as the comparison value.

4. The road surface damage detection device according to claim 1, wherein the second processor sets as the threshold a value that is smaller by a margin than the past determination target value when it is determined that the road surface damage has occurred.

5. The road surface damage detection device according to claim 4, wherein the second processor sets the margin based on one of or both the number of vehicles used for setting the latest section maximum variation rate and the number of vehicles used for setting the comparison value.

6. The road surface damage detection device according to claim 5, wherein the margin is set to be smaller as the number of vehicles used for setting the latest section maximum variation rate and the number of vehicles used for setting the comparison value becomes larger.

7. The road surface damage detection device according to claim 1, wherein the second processor calculates an interquartile range using a past maximum variation rate of each of the vehicles when it is determined that the road surface damage has not occurred, and sets as the threshold a value that is larger by a margin than a prescribed multiple of the calculated interquartile range.

8. The road surface damage detection device according to claim 7, wherein the second processor calculates the interquartile range using all the past maximum variation rate of each of the vehicles when determining that the road surface damage has not occurred.

9. The road surface damage detection device according to claim 7, wherein the second processor calculates the interquartile range using the past maximum variation rate of each of the vehicles when determining that the road surface damage has not occurred in a second prescribed period.

10. The road surface damage detection device according to claim 1, wherein after determining that the road surface damage has occurred, the second processor compares the determination target value with a negative second threshold to determine whether or not the road surface damage is eliminated.

11. A road surface damage detection method for detecting a road surface damage for each of road sections based on vehicle information from each of vehicles that have traveled, the method comprising:
(a) a step of calculating, for each of the road sections, a maximum variation rate for each of a plurality of vehicles, the maximum variation rate being a maximum value of a variation amount of a wheel speed per unit time in each of the vehicles;
(b) a step of periodically selecting a maximum value from among the maximum variation rates calculated for the plurality of vehicles in a prescribed period for each of the road sections, setting the selected maximum value as a section maximum variation rate, and determining whether or not the road surface damage has occurred by comparing a determination target value with a positive threshold, the determination target value being obtained by subtracting a comparison value from a first section maximum variation rate that the section maximum variation rate set latest by the second processor, the comparison value being based on a fourth section maximum variation rate including at least one of a second section maximum variation rate that is the section maximum variation rate when last set by the second processor or a third section maximum variation rate that is the section maximum variation rate that is set before the second processor sets the second section maximum variation rate; and
(c) a step of setting the second section maximum variation rate as the comparison value.

12. A program for causing a computer to function as a road surface damage detection device for detecting a road surface damage for each of road sections based on vehicle information from each of vehicles that have traveled, the program comprising:
(a) a step of calculating, for each of the road sections, a maximum variation rate for each of a plurality of vehicles, the maximum variation rate being a maximum value of a variation amount of a wheel speed per unit time in each of the vehicles; and
(b) a step of periodically selecting a maximum value from among the maximum variation rates calculated for the plurality of vehicles in a prescribed period for each of the road sections, setting the selected maximum value as a section maximum variation rate, and determining whether or not the road surface damage has occurred by comparing a determination target value with a positive threshold, the determination target value being obtained by subtracting a comparison value from a first section maximum variation rate that the section maximum variation rate set latest by the second processor, the comparison value being based on a fourth section maximum variation rate including at least one of a second section maximum variation rate that is the section maximum variation rate when last set by the second processor or a third section maximum variation rate that is the section maximum variation rate that is set before the second processor sets the second section maximum variation rate; and
(c) a step of setting the second section maximum variation rate as the comparison value.

* * * * *